ated July 23, 1957

2,800,486

PROCESS FOR PREPARING 1,2,4-TRIAZOLES

Christoph J. Grundmann and Rudi F. W. Rätz, Columbus, Ohio, assignors to Olin Mathieson Chemical Corporation, a corporation of Virginia No Drawing. Application March 29, 1956, Serial No. 574,586

5 Claims. (Cl. 260—308)

Our invention relates to a novel method of preparing 1,2,4-triazoles. More particularly, our invention relates to the preparation of 1,2,4-triazoles from 1,3,5-triazine and a hydrazine hydrohalide.

It is known that 1,3,5-triazine reacts with ammonium chloride to form formamidine hydrochloride. Furthermore, co-pending application, Serial No. 467,229, filed November 5, 1954, of Christoph J. Grundmann and Alfred Kreutzberger, teaches that 1,3,5-triazine reacts with primary amines to form disubstituted formamidines. In view of the formation of amidines in the two former instances it was expected that 1,3,5-triazine would react with hydrazine monohydrochloride to give the formamidrazone hydrochloride: $H_2NCH=NNH_2 \cdot HCl$.

Surprisingly, however, we have discovered that the reaction of 1,3,5-triazine with a hydrazine hydrohalide results in the formation of a triazole ring. Thus, the following reaction occurs:

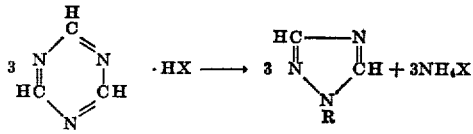

wherein X is a halogen and R is hydrogen or an alkyl or aryl group.

The reaction is carried out by admixing the reactants. For example, 1,3,5-triazine is melted with the hydrazine hydrohalide or the reaction is carried out in the presence of a suitable solvent. Particularly suitable solvents are those in which the by-product ammonium halide is insoluble. The solvent should be anhydrous and preferably one in which the triazole is sufficiently soluble to enable an easy separation of the reaction product. Examples of suitable solvents are organic liquids such as lower aliphatic alcohols, e. g., methanol and ethanol. In some cases reaction occurs on mixing. It is desirable to reflux the reaction mixture, however. The reaction then can be carried out from room temperature to about 100° C. The ammonium halide is removed, for example, by filtration and the triazole is recovered, for example, by distillation or crystallization.

Preferably, the reactants are used in stoichiometric proportions as this results in substantially quantitative yield of the triazoles.

The hydrazines useful in our invention include hydrazine and monosubstituted hydrazines. The monosubstituted hydrazines useful in our invention include alkyl and aryl substituted hydrazines. Particularly useful alkylhydrazines are the lower alkylhydrazines in which the number of carbon atoms in the alkyl group is less than 4, e. g., methylhydrazine, ethylhydrazine and propylhydrazine. Useful arylhydrazines include phenylhydrazine, tolylhydrazine and alphanaphthylhydrazine. The aryl groups also can have substituents such as halogens or nitro groups, e. g., p-nitrophenylhydrazine and p-bromophenylhydrazine are useful. The use of monosubstituted hydrazines produces 1-substituted-1,2,4,-triazoles.

The hydrazines must be used in the form of their monohydrohalide salts. The hydrohalide is preferably the hydrochloride but other hydrohalide salts are useful, e. g., the hydrobromide, hydrofluoride and hydroiodide. It is preferable to use salts which dissolve in solvents suitable for the reaction, for example methanol or ethanol, or which have a sufficiently low melting point in order to furnish a homogenous melt with the 1,3,5-triazine.

The 1,2,4-triazoles produced by the process of our invention are useful, for example, as intermediates in the preparation of many useful chemical compositions.

The process of our invention will be further illustrated by reference to the following examples.

Example I

About 600 milliliters of absolute ethanol was distilled over metallic sodium and 16.2 grams of 1,3,5-triazine was dissolved therein. To this was added 20.55 grams of well powdered hydrazine monohydrochloride and the mixture was refluxed for 8 hours. The mixture was then cooled and 9 grams of ammonium chloride were filtered off. Upon the addition of ether, an additional 7 grams of ammonium chloride precipitated. The red colored alcohol ether filtrate was evaporated in vacuo to dryness, whereupon 21 grams of crystalline triazole remained. By recrystallizing the product from chloroform 20 grams of pure 1,2,4-triazole was obtained. The purified product melted at 112° C. and was obtained in 96 percent yield.

|  | N |
|---|---|
| Calculated for $C_2H_3N_3$ | 60.87 |
| Found | {28.63<br>{60.70 |

Example II

A mixture of 16.2 grams of 1,3,5-triazine and 43.4 grams of phenylhydrazine monohydrochloride were refluxed in 200 milliliters of absolute ethanol for 12 hours. After cooling, 12.5 grams of ammonium chloride were filtered off and the filtrate was distilled to remove the alcohol. There remained 40 grams of a light colored oil which crystallized on chilling to 0° C. to almost pure 1-phenyl-1,2,4-triazole. The compound was distilled at atmospheric pressure and there was obtained 36 grams or 83 percent of the theory of 1-phenyl-1,2,4-triazole, which melted at 47° C. and boiled at 268 to 270° C.

|  | N |
|---|---|
| Calculated for $C_8H_7N_3$ | 28.95 |
| Found | {28.63<br>{28.68 |

Example III

A solution comprising 3.24 grams of 1,3,5-triazine in 30 milliliters of absolute ethanol was made up. To this solution was added 4.95 grams of methylhydrazine monohydrochloride and the reaction started immediately with the evolution of heat. It was then completed by refluxing for 8 hours. The product was then filtered to remove 2.2 grams of ammonium chloride and the alcohol was removed by distillation. Upon extracting the oily residue with ether an additional 0.9 gram of ammonium chloride precipitated and was removed by filtration. The etherial filtrate was then distilled to leave behind 5 grams of yellowish oil which was almost pure 1-methyl-1,2,4-triazole. Upon distillation of the latter at atmospheric pressure there was obtained 4.0 grams or 81 percent of the theory of 1-methyl-1,2,4-triazole which melted at 20° C. and boiled at 175 to 176° C.

|  | N |
|---|---|
| Calculated for $C_3H_5N_3$ | 50.57 |
| Found | {50.12<br>{50.10 |

We claim:
1. A process for preparing 1,2,4-triazoles which comprises admixing 1,3,5-triazine with a hydrazine hydrohalide of the formula:

$$RNHNH_2 \cdot HX$$

wherein R is selected from the group consisting of hydrogen and lower alkyl, aryl, haloaryl, an nitroaryl radicals, said aryl radicals being hydrocarbon radicals of not more than 10 carbon atoms, and X is a halogen.

2. The process of claim 1 in which the hydrazine is hydrazine monohydrochloride.

3. The process of claim 1 in which the hydrazine is methylhydrazine monohydrochloride.

4. The process of claim 1 in which the hydrazine is phenylhydrazine monohydrochloride.

5. The process of claim 1 in which the process is carried out at a temperature of about room temperature to about 100° C.

No references cited.

UNITED STATES PATENT OFFICE
Certificate of Correction

July 23, 1957

Patent No. 2,800,486

Christoph J. Grundmann et al.

It is hereby certified that error appears in the printed specification of the above numbered patent requiring correction and that the said Letters Patent should read as corrected below.

Column 1, lines 33 to 38, left-hand portion of the formula should appear as shown below instead of as in the patent—

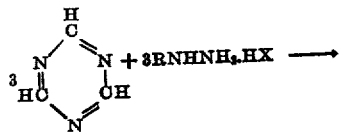

column 2, line 31, Example 1, for "28.63" read —60.80—; column 8, line 8, claim 1, for "an nitroaryl" read —and nitroaryl—.

Signed and sealed this 29th day of October 1957.

[SEAL]

Attest:
KARL H. AXLINE,
*Attesting Officer*

ROBERT C. WATSON,
*Commissioner of Patents.*